US009516063B2

(12) United States Patent
Savage et al.

(10) Patent No.: US 9,516,063 B2
(45) Date of Patent: Dec. 6, 2016

(54) SYSTEM, METHOD, AND COMPUTER-READABLE MEDIUM FOR PERFORMING AUTOMATED SECURITY VALIDATION ON A VIRTUAL MACHINE

(71) Applicant: Raytheon Company, Waltham, MA (US)

(72) Inventors: Britt C. Savage, Rockwall, TX (US); Shawna L. Kellam, Sachse, TX (US); Elizabeth A. Grant, Wylie, TX (US)

(73) Assignee: Raytheon Company, Waltham, MA (US)

( * ) Notice: Subject to any disclaimer, the term of this patent is extended or adjusted under 35 U.S.C. 154(b) by 87 days.

(21) Appl. No.: 14/643,644

(22) Filed: Mar. 10, 2015

(65) Prior Publication Data
US 2016/0269441 A1    Sep. 15, 2016

(51) Int. Cl.
| G06F 17/00 | (2006.01) |
| H04L 29/06 | (2006.01) |
| G06F 9/455 | (2006.01) |

(52) U.S. Cl.
CPC .......... *H04L 63/20* (2013.01); *G06F 9/45558* (2013.01); *H04L 63/105* (2013.01); *G06F 2009/45587* (2013.01); *G06F 2009/45595* (2013.01)

(58) Field of Classification Search
CPC .... H04L 63/20; H04L 63/105; G06F 9/45558; G06F 2009/45587; G06F 2009/45595
USPC .......................................................... 726/1
See application file for complete search history.

(56) References Cited

U.S. PATENT DOCUMENTS

| 7,823,186 B2 * | 10/2010 | Pouliot | G06F 21/53 |
| | | | 726/1 |
| 8,544,003 B1 * | 9/2013 | Sawhney | G06F 21/50 |
| | | | 709/220 |
| 8,583,920 B1 * | 11/2013 | Bursell | G06F 21/44 |
| | | | 713/164 |
| 8,601,583 B1 * | 12/2013 | Chandrasekhar | G06F 21/54 |
| | | | 726/24 |
| 8,635,351 B2 * | 1/2014 | Astete | 709/215 |
| 8,752,047 B2 * | 6/2014 | Banga | G06F 21/53 |
| | | | 718/1 |
| 2007/0006218 A1 * | 1/2007 | Vinberg | G06F 8/61 |
| | | | 717/174 |

(Continued)

*Primary Examiner* — Samson Lemma
(74) *Attorney, Agent, or Firm* — Schwegman Lundberg & Woessner, P.A.

(57) ABSTRACT

An automated build server communicates with an automated build client to build virtual clients hosted by a virtual server. The automated build client communicates with the automated build server to obtain a configuration of the virtual client. The configuration specifies a previously approved security baseline for configuring the resources of the virtual client. The virtual client then obtains a security validation tool that audits the security baseline of the newly built virtual client. Based on the results of the security audit, the virtual client is placed in an operational mode or in a restricted operating mode. The restricted operating has limitations on resources when compared with the operational mode. An administrator is then notified of the security audit failure, who can then update the configuration stored by the automated build server to conform it with the security baseline used by the security validation tool in its security audit.

13 Claims, 6 Drawing Sheets

(56) References Cited

U.S. PATENT DOCUMENTS

| | | | | |
|---|---|---|---|---|
| 2007/0174429 A1* | 7/2007 | Mazzaferri | ............ | G06F 3/1415 709/218 |
| 2009/0222880 A1* | 9/2009 | Mayer | ................. | G06F 21/6218 726/1 |
| 2011/0047541 A1* | 2/2011 | Yamaguchi | ......... | G06F 9/45558 718/1 |
| 2011/0289513 A1* | 11/2011 | Degirmenci | ............ | G06F 9/542 719/313 |
| 2012/0311575 A1* | 12/2012 | Song | .................... | G06F 9/5077 718/1 |
| 2013/0297849 A1* | 11/2013 | Wagner | .................. | G06F 12/10 711/6 |
| 2015/0358392 A1* | 12/2015 | Ramalingam | ........... | H04L 67/10 709/203 |

* cited by examiner

SYSTEM, METHOD, AND COMPUTER-READABLE MEDIUM FOR PERFORMING AUTOMATED SECURITY VALIDATION ON A VIRTUAL MACHINE

GOVERNMENT SUPPORT

This invention was made with government support under Contract No. 08-C-3104. The government has certain rights in the invention.

TECHNICAL FIELD

Embodiments of the present disclosure relate generally to security validation and, more particularly, but not by way of limitation, to automatically deploying one or more virtual clients and conducting an automated security validation on the deployed one or more virtual clients.

BACKGROUND

A hypervisor is a virtual machine manager that facilitates access to a host machine's hardware among one or more virtual clients (e.g., a virtual computer executing a virtual operating system) that may be instantiated on the host machine. In a secure environment, the virtual client may be configured with a security policy. The security policy may have been approved by a government official or other third-party. In some instances, the processing for approving the security policy may take a significant amount of time, such as weeks or months. Thus, when a virtual client is instantiated with the security policy, the virtual client must be audited to confirm that the virtual client conforms to the approved security policy. This process can also take an inordinate amount of time, which delays the deployment of the virtual client.

Further still, if the virtual client is instantiated with an application that has changed since the approval of the security policy, there is the potential that the virtual client will fail the audit. In instances where the security audit is performed manually, there is a non-trivial chance that the auditor will miss the change in the virtual client—leading to the operation of a virtual client that does not conform to the previously approved security policy. Security policies may also change, which introduces another non-trivial possibility that the auditor may approve a virtual client for operation.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, an automated build client is established on a virtual server configured to host one or more virtual clients. The virtual server is configured to execute a hypervisor for the one or more virtual clients, such as KVM, which is integrated into the Linux kernel or Xen, which is available from Citrix Systems, Inc., or Hyper-V, which is available from Microsoft Corp. The automated build server is in communication with the automated build client and configured to communicate build instructions to the automated build client. One example of an automated building environment, which includes an automated build server and an automated build client, is Chef®, which is available from Chef Software, Inc. The automated build server further retains (e.g., stores) resource configurations used by the automated build client in instantiating a virtual client. The automated build server further has access to one or more security policies which are deployed to the virtual client, such as at a predetermined point during or after the build phase. The security policies are typically previously approved by an accrediting authority or other third-party.

A security validation tool, e.g., a Portable Hardening Toolkit (PHT), is configured to recognize the known security policies. Examples of a Portable Hardening Toolkit include HoneyPoint Wasp, available from MicroSolved, Inc., Nessus®, available from Tenable Network Security, and GFI LanGuard, available from GFI Software. When a virtual client is created by the automated build client, the final step of the build process is to audit the security baseline of the newly created virtual client. In one embodiment, the auditing is performed by the virtual client obtaining the PHT (e.g., from an application server) and locally executing the PHT. In other words, the virtual client uses the PHT to audit the installed security policy and validate it against the previously approved security policies.

Depending on the result of the auditing, the virtual client may or may not go into operation, or, alternatively, be placed in a restricted mode with limited access and use of its resources. For example, if the PHT successfully validates the configuration of the virtual client (e.g., the resources configured on the virtual client align with the approved security policy obtained by the PHT), the PHT sends the build process a successful return code, and the virtual client is allowed to go into operations.

However, if the PHT determines that the virtual client is not properly configured relative to the security policy loaded into the PHT, the PHT sends an unsuccessful return code to the build process. The automated build client then executes an alternate set of build procedures that places the virtual client in a restricted or non-operational mode (e.g., a second operating mode). In alternative embodiments, depending on the audit failure, the PHT may return more or different return codes such that corresponding build procedures are executed depending on the returned build code. For example, rather than having a binary determination (e.g., a pass/fail security auditing procedure), the PHT may include a conditional determination such that different return codes are returned depending on which conditions are satisfied (e.g., a first defined set of improperly configured resources causes the PHT to return a first return code whereas a second defined set of improperly configured resources causes the PHT to return a second return code).

In one embodiment, alternate build procedure places the virtual client in a restricted operating mode by restricting at least two resources. First, the automated build client configures pluggable authentication method rules to only allow administrative personnel to log into (e.g., access) the virtual client. Then, the automated build client configures a host-based packet filter, such as IPTables, which is available from Netfilter.Org, to only allow specific types of network traffic (e.g., administrative network traffic) to reach the virtual client. These restrictions allow administrators to access into the virtual client and address the issues that caused the build process to fail the security audit, while preventing the virtual client from being used in an operational state. The administrators can then go fix the build process and build a new virtual client.

In summary, the technical problem addressed by the disclosed systems and methods is increasing the efficiency of resources used in building and auditing a virtual client such that the time to build, audit, and resolve an audit failure is reduced by several orders of magnitude. Whereas previous build and auditing procedures may have lasted weeks, the disclosed systems and methods reduce that time to mere minutes. Thus, the disclosed systems and methods markedly increase the efficiency by which the build, audit, and resolve phases are conducted when a new virtual client is requested having a previously approved security policy.

Figure 1:
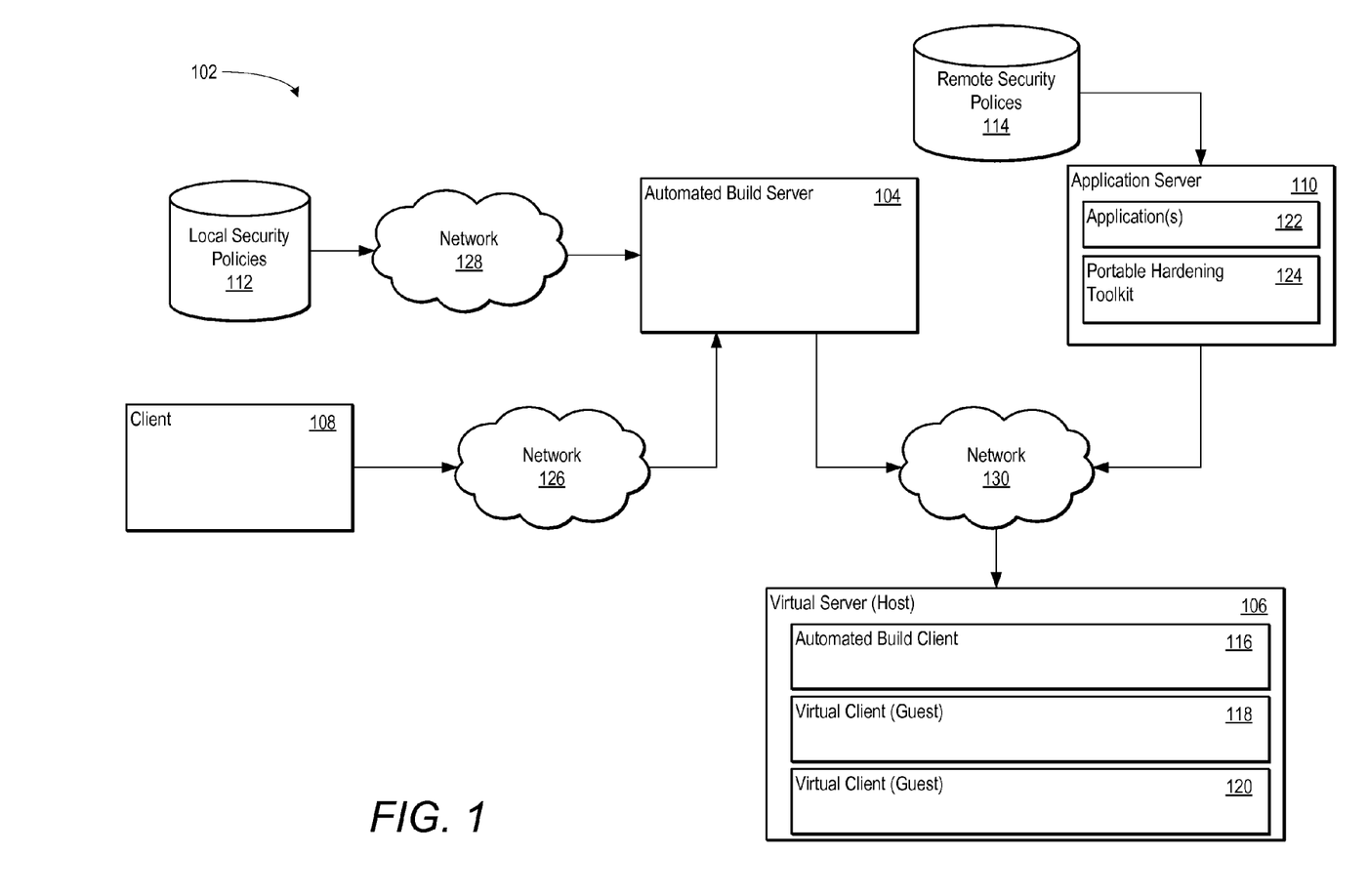
FIG. 1 is a block diagram illustrating an automated build environment, according to an example embodiment.

FIG. 1 is a block diagram illustrating an automated build environment 102, according to an example embodiment. The automated build environment 102 includes an automated build server 104 that provides server-side functionality via a network 126 (e.g., the Internet or wide area network (WAN)) to one or more client devices 108. The automated build server 104 includes one or more user interfaces for communicating with the client device, such as a web interface (e.g., via the HyperText Transfer Protocol), a programmatic interface (e.g., via one or more Application Programming Interfaces), or combinations thereof.

The client device 108 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics or any other communication device that a user may utilize to access the automated build environment 102. In some embodiments, the client device 108 may comprise a display module (not shown) to display information (e.g., in the form of user interfaces). In further embodiments, the client device 108 may comprise one or more of a touch screens, accelerometers, gyroscopes, cameras, microphones, global positioning system (GPS) devices, and so forth. The client device 108 may provide instructions or otherwise interact with the automated build server 104 via a network 126.

The automated build server 104 is configured to interact and communicate with various other devices and/or machines in the automated build environment 102. In one embodiment, the automated build server 104 communicates with an application server 110, a virtual server 106, and a datastore of local security policies 112. As discussed below with reference to FIG. 2, the automated build server 104 stores configurations for instantiating a virtual client on the virtual server 106. A configuration for a particular resource (or a group of resources) is known as a "recipe," and a collection of such recipes is known as a "cookbook." Thus, different configurations of different virtual clients (e.g., virtual clients 118-120) are possible depending on which cookbook is requested by the client device 108. Further still, the automated build server 104 is configured to retrieve one or more of the local security policies from the local security policies datastore 112. The datastore 112 may include a hierarchical database, a relational database, one or more flat files, or any of the combinations of the foregoing.

The local security policies include one or more security policies that were previously approved by a third-party accreditation service, such as the Defense Information Systems Agency Field Security Operations (DISA FSO). A security policy defines the authorized configuration for a given virtual client, such as whether the virtual client has Internet access, open and/or closed ports (e.g., a software construct serving as a communications endpoint in a computer's host operating system and associated with an IP address and a protocol type of the communication), the services that are executed by the virtual client, which applications are authorized to be run by the virtual client and/or any restrictions on such applications, the types of users that may access the virtual client, and other such policies. As discussed below, the automated build client 116 implements the security policy on a given virtual client 118-120 at a predetermined point in the building of the virtual client 118-120, such as at a time when a given recipe is implemented or shortly after a cookbook is implemented, but before the virtual client 118-120 has been audited.

The automated build server 104 includes a configuration management module, such as Chef®, to facilitate the building of a virtual client on the virtual server 106. As discussed below with reference to FIG. 2, when the client device 108 access the automated build server 104, the automated build server 104 provides a list of available nodes, via the automated build client 116, where a virtual client may be instantiated (e.g., the virtual server 106). As discussed below with reference to FIG. 3, the virtual server 106 includes components found in a computing environment (e.g., one or more processors, memory, hardware and software interfaces, etc.), and includes a hypervisor (e.g., a Type 1 and/or Type 2 hypervisor) for instantiating the virtual clients 118-120. A Type 1 hypervisor typically has direct access (e.g., "native" access) to the hardware components of the host computing environment, and examples of Type 1 hypervisors include KVM, Xen (or XenServer), Hyper-V, and vSphere (available from VMWare, Inc.). A Type 2 hypervisor is typically managed by an operating system and access the hardware of the computing environment through an abstraction layer provided by the operating system. Examples of Type 2 hypervisors include VMWare Fusion, available from VMWare, Inc., VMWare Workstation (also available from VMWare, Inc.), VirtualBox, available from Oracle Corp, and other such Type 2 hypervisors.

The configuration management module then receives an instruction from the client device 108 to instantiate a new virtual client (e.g., virtual client 118-120) on a selected node via the installed hypervisor. The configuration management module then communicates with the automated build client 116 to build the virtual client on the selected node.

During the building of the virtual client, the automated build client 116 accesses the automated build server 104 for instructions (e.g., one or more recipes and/or one or more cookbooks) on how the virtual client should be configured. In one embodiment, the automated build server 104 obtains the previously approved security policies via the local security policies datastore 112 and configures the recipes and/or cookbooks to provide to the automated build client 116. In one embodiment, the local security policies are written in a computing programming and/or scripting language, such as Ruby, and the recipes stored by the automated build server 104 (also written in the computing programming and/or scripting language) are amended accordingly. For example, the automated build server 104 may include a "default" or generic set of recipes (e.g., a generic cookbook) and each of the recipes may be amended or modified according to a selected security policy to create a cookbook specific to the selected security policy. In an alternative embodiment, the automated build server 104 creates cookbooks at periodic time intervals (e.g., monthly, weekly, etc.) or upon request according to the local security policies stored in the local security policy datastore 112. By pre-generating/pre-configuring the cookbooks available to the automated build client 116, the automated build server 104 reduces the time needed to construct a given virtual client.

During the build phase, the automated build client 116 may obtain one or more applications (e.g., resources) to include in a given virtual client from an application server 110. In one embodiment, the application server 110 is remote to the automated build client 116 and includes one or more applications 122 for instantiating (e.g., installing) on a given virtual node. The application server 110 executes an operating system, such as RedHat Linux, Microsoft Windows, or other such operating system, and provides the applications 122 to the automated build client 116 via a network, such as network 130.

As discussed below, in one embodiment, the application server 110 further provides the PHT 124 for auditing the security policy instantiated on a given virtual client. One or more remote security policies, via a datastore 114, may be accessible to the application server 110 and/or PHT 124. In one embodiment, when the PHT 124 audits the security configuration of a given virtual client, the PHT 124 leverages one or more of the remote security policies rather than the local security policy used by the automated build server 104. In this embodiment, the remote security policies 114 may be updated and/or approved more frequently than the local security policies 112 such that the remote security policies represent the most up-to-date version of a given security policy. In an alternative embodiment, the PHT 124 may leverage a local security policy from the datastore 112 in auditing the security configuration of a given virtual client. Using a selected local security policy is still beneficial because, in some instances, an application residing on the application server 110 may be updated such that the updates to the application violate the local security policy implemented by the automated build client 116.

In one embodiment, the automated build environment 102 is implemented under a distributed computing model such that the various machines (e.g., automated build server 104, virtual server 106, and application server 110) communicate through one or more networks 126-130. One or more portions of the networks 126-130 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Further, while the automated build environment 102 employs a client-server architecture, the present inventive subject matter is of course not limited to such an architecture, and could equally well find application in a distributed, or peer-to-peer, architecture system, for example. Further still, one or more of the machines may be implemented on the same physical machine with the same physical hardware. Thus, the automated build server 104, the application server 110, and the virtual server 106 may share one or more of the same resources (e.g., processors, volatile and non-volatile memory, physical user interfaces, etc.). The various automated build server 104, application server 110, and virtual server 106 could also be implemented as standalone software programs, which do not necessarily have networking capabilities.

Figure 2:
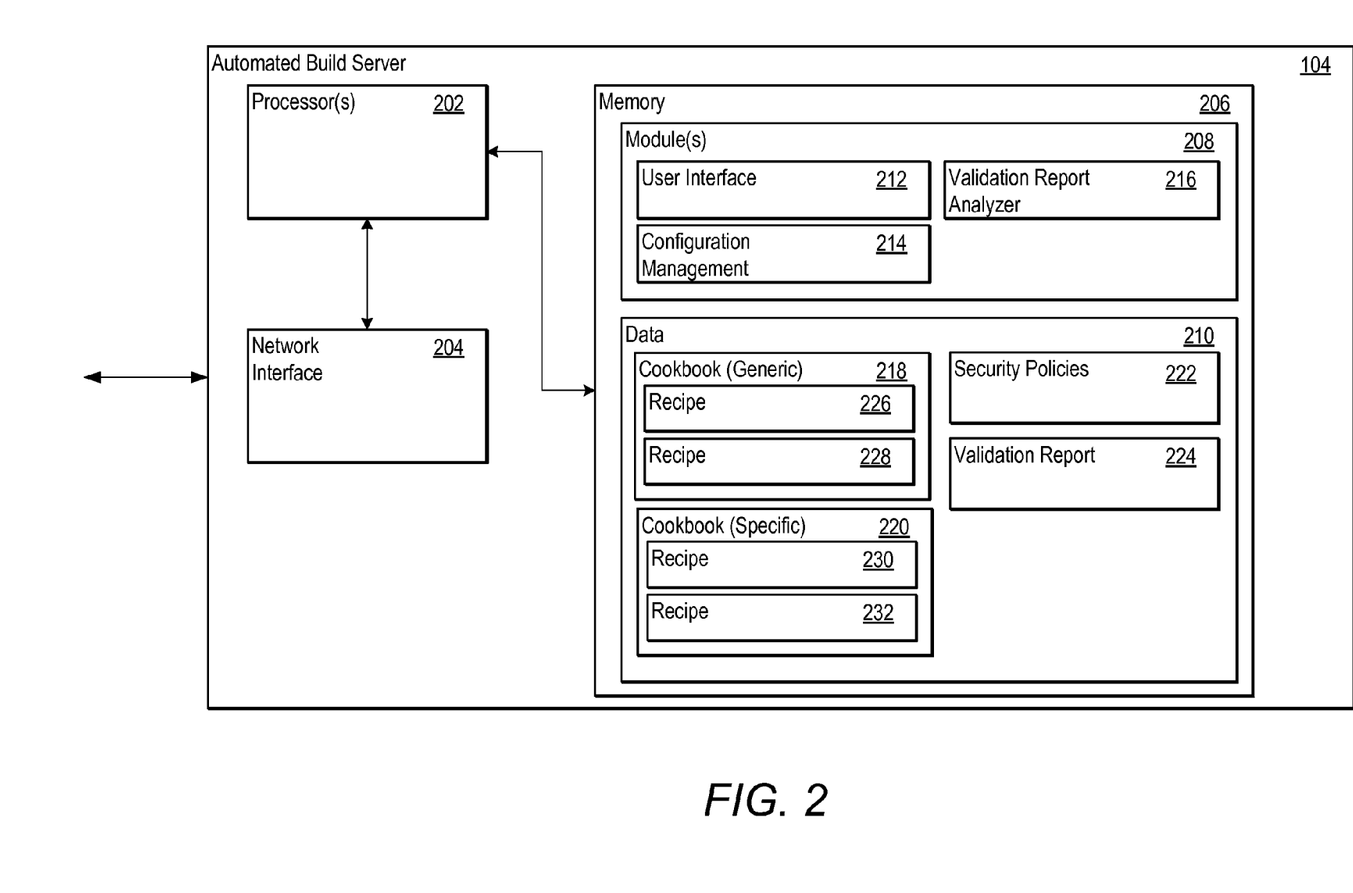
FIG. 2 is a block diagram illustrating an automated build server according to an example embodiment.

FIG. 2 is a block diagram illustrating the automated build server 104 according to an example embodiment. In one embodiment, the automated build server 104 includes one or more processors 202, a memory 206, and a network interface 204. As discussed above, the automated build server 104 is configured to facilitating the instantiating and building of a virtual client on the virtual server 106 via the automated build client 116.

The processors 202 may be a special-purpose processor, such as a Field-Programmable Gate Array (FPGA) or an Application Specific Integrated Circuit (ASIC). The processors 202 may also include programmable logic or circuitry that is temporarily configured by software to perform certain operations. For example, the processors 202 may be configured by software, such that the processors 202 become specific machines (or specific components of a machine) uniquely tailored to perform the configured functions and are no longer general-purpose processors. The processors 202 may also be implemented as hardware modules as that term is used herein.

The network interface 204 includes one or more communication interfaces for sending and/or receiving data from one or more of the machines in the automated build environment 102. The network interface 204 may include wired interfaces (e.g., an Ethernet interface), a wireless interface (e.g., an 802.11 g/n interface or Bluetooth® interface), or any combination of wired and wireless interfaces.

The memory 206 is configured to store modules 208 and data 210, temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. In one embodiment, modules 208 are represented by computer-executable instructions that are executable by the processors 202. The term "memory" should be taken to include a single machine-readable medium or multiple media (e.g., a centralized or distributed database, or associated caches and servers) able to store the instructions. The term "machine-readable medium" shall be taken to include any medium, or combination of multiple media, that is capable of storing instructions such that, when the instructions are by one or more processors 202, the automated build server 104 performs any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The modules 208 include a user interface module 212, a configuration management module 214, and a validation report analyzer module 216. The data 210 includes data 210 used by the processors 202 to support the functionalities of the modules 208 and includes such data as one or more cookbooks 218-220, one or more security policies 222, and a validation report 224 received from the PHT 124.

The user interface module 212 is configured to receive instructions from, and display results to, the client device 108. As discussed previously, the automated build server 104 is configured to receive a build instruction from the client device 108 to build a virtual client on a selected node (e.g., virtual server 106) in communication with the automated build server 104. Further still, the automated build server 104 may provide a selection of configurations (e.g., cookbooks) and/or security policies for a user of the client device 108 to select in building the virtual client. In one embodiment, the configuration management module 214 communicates the available nodes on which to build the virtual client and the configuration to use in building the virtual client. In one embodiment, the configuration management module 214 modifies an existing set of recipes (e.g., a default or generic cookbook 218) given a selected security policy to transform the default cookbook 218 into a specific cookbook 220 (e.g., a cookbook having recipes that conform to the selected security policy). In another embodiment, the automated build server 104 obtains the pre-approved security policies (e.g., stored as security policies 222) and, for each security policy, creates a cookbook and/or recipe that conforms to a corresponding security policy.

The output produced by the user interface 212 includes status updates regarding the build of the selected virtual client and whether the auditing performed by the PHT 124 was successful or not. In one embodiment, the user interface 212 communicates a validation report 224 produced by the PHT 124 that informs the user of the client device 108 of the audits performed by the PHT 124 and whether such audits were successful. Where an audit is unsuccessful, the validation report 224 may include an identification of the resource that did not pass the security audit and potential measures that the user could take to remedy the failed audit. For example, where a resource is a service, and the security policy indicates that the service can only provide access via port 8080, but the service is configured service on both port 8080 and 80, the validation report 224 would indicate that the user may remedy the failed audit by closing port 80 to the service. While the foregoing example uses a service as an example resource, other resources may include applications, a network packet filter, user accounts, and other such resources.

In addition to the validation report 224, the user interface 212 may provide the status of building the virtual client (e.g., the time or percentage until the build has completed, whether the installation and configuration of a given resource was a success or failure, the remaining number or percentage of resources to instantiate on the virtual client, etc.) and the operating mode of the virtual client once the build process has completed and the virtual client has been audited.

As discussed above, the virtual client may be placed in an operating mode selected from a plurality of operating modes depending on the results of the security audit performed by the PHT 124. In one embodiment, the PHT 124 communicates with the automated build server 104 and communicates a message that includes the validation report 224. For example, the PHT 124 may communicate a security audit completion message to the configuration management module 214, which may then invoke the validation report analyzer module 216. The configuration management module 214 may also communicate a message to the automated build client 116 to pause the build process until the analysis of the validation report 224 is complete.

The validation report analyzer 216 then analyzes the validation report 224 to determine whether the audit was successful. Where the security audit is successful, the virtual client may be placed in a "live" operating mode where the virtual client may be used as intended (e.g., according to the security policy). Where the security audit is unsuccessful, the virtual client may be placed in a restricted operating mode where the virtual client is restricted from being used as intended. In an alternative embodiment, there may be different levels of restricted operating modes (e.g., from least restrictive to most restrictive) depending on which resources, or the number of resources, that failed the security audit.

To place the virtual client in a restricted mode (or a mode different than an operational mode), the automated build server 104 maintains one or more cookbooks (e.g., cookbook 220) that correspond to an applicable operating mode of the virtual client. The configuration management 214 then instructs the automated build client 116 to use the cookbook associated with the corresponding operating mode determined by the validation report analyzer 216. In this manner, the automated build client 116 retrieves the recipes (e.g., recipes 230-232) corresponding to the operating mode determined by the validation report analyzer 216, and instantiates and/or configures the resources of the virtual client according to the retrieved recipes. As discussed previously, the restrictions on the virtual client may include allowing only administrative personnel to log into (e.g., access) the virtual client or only allowing specific types of network traffic (e.g., administrative network traffic) to reach the virtual client. These restrictions allow administrators to access the virtual client and address the issues that caused the build process to fail the security audit, while preventing the virtual client from being used in an operational state.

In an alternative embodiment, the PHT 124 communicates directly with the automated build client 116, and informs the automated build client whether the security audit of the virtual client was a success or failure. In parallel, the PHT 124 may also communicate the validation report 224 to the automated build server 104 for communicating to the client device 108. In this embodiment, the automated build server 104 maintains a cookbook corresponding to a failed security audit, which includes recipes for configuring the resources of the virtual client to operate in a restricted mode, that the automated build client 116 retrieves after it receives the audit completion message from the PHT 124.

After the security audit is completed, the operating mode of the virtual client may be communicated to the user of the client device 108 via the user interface 212.

Figure 3:
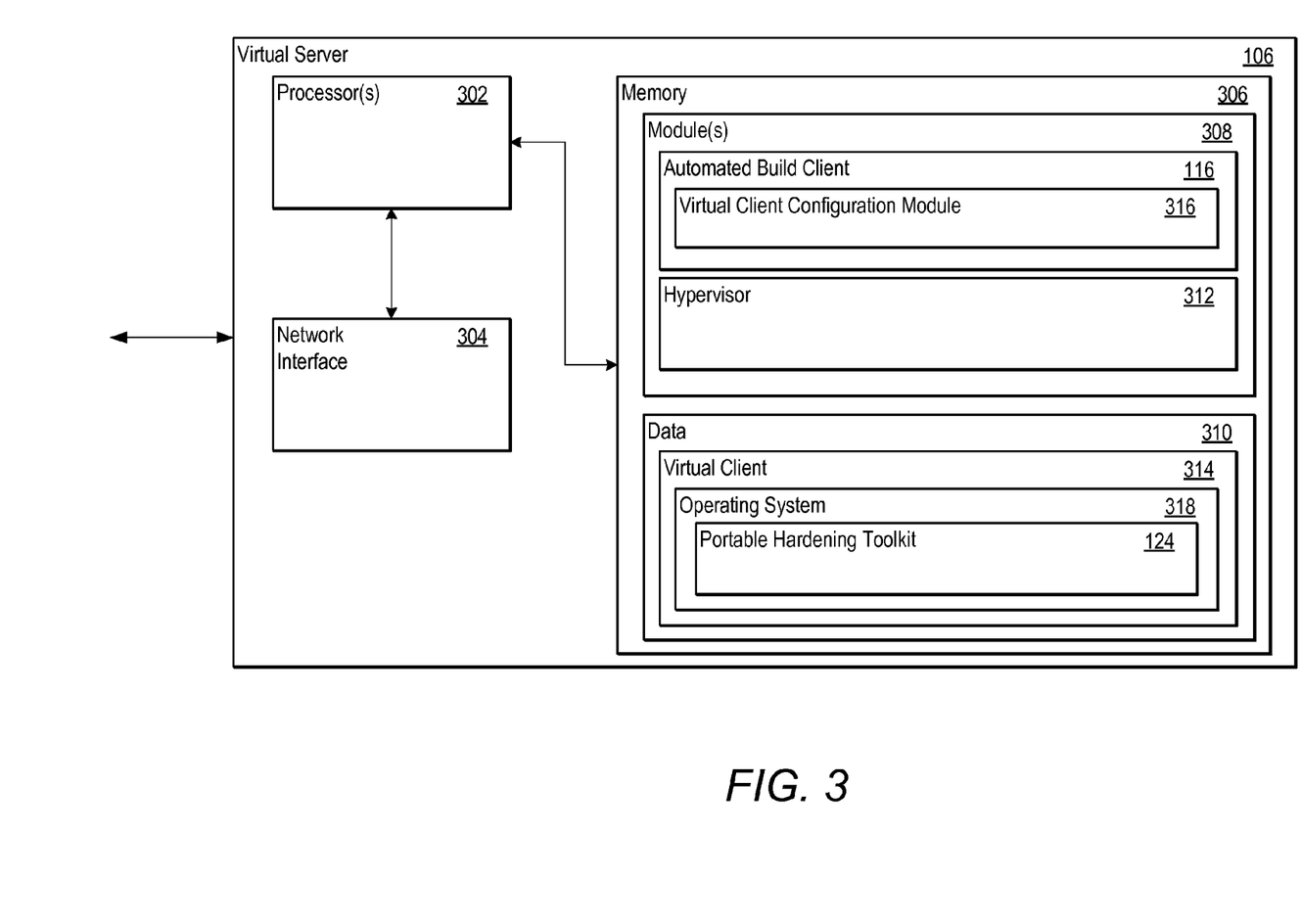
FIG. 3 is a block diagram illustrating an virtual server, according to an example embodiment, in communication with the automated build server.

FIG. 3 is a block diagram illustrating the virtual server 106 according to an example embodiment. In one embodiment, the virtual server 106 includes one or more processors 302, a memory 306, and a network interface 304. As discussed above, the virtual server 106 includes the automated build client 116, which is configured to build a virtual client (e.g., virtual client 314) executable by the virtual server 106.

The processors 302 may be a special-purpose processor, such as a Field-Programmable Gate Array (FPGA) or an Application Specific Integrated Circuit (ASIC). The processors 302 may also include programmable logic or circuitry that is temporarily configured by software to perform certain operations. For example, the processors 302 may be configured by software, such that the processors 302 become specific machines (or specific components of a machine) uniquely tailored to perform the configured functions and are no longer general-purpose processors. The processors 302 may also be implemented as hardware modules as that term is used herein.

The network interface 304 includes one or more communication interfaces for sending and/or receiving data from one or more of the machines in the automated build environment 102. The network interface 304 may include wired interfaces (e.g., an Ethernet interface), a wireless interface (e.g., an 802.11 g/n interface or Bluetooth® interface), or any combination of wired and wireless interfaces.

The memory 306 is configured to store modules 308 and data 310, temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. In one embodiment, modules 308 are represented by computer-executable instructions that are executable by the processors 302. The term "memory" should be taken to include a single machine-readable medium or multiple media (e.g., a centralized or distributed database, or associated caches and servers) able to store the instructions. The term "machine-readable medium" shall be taken to include any medium, or combination of multiple media, that is capable of storing instructions such that, when the instructions are by one or more processors 302, the virtual server 106 performs any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The modules 308 include the automated build client 116, a hypervisor 312, and a virtual client configuration module 316. The data 310 includes data used by the processors 302 to support the functionalities of the modules 308 and includes such data as a virtual client 314, which may operate within the hypervisor 312. In addition, the virtual client 314 includes its own operating system 318 (e.g., a "guest" operating system), which is configured to locally execute the PHT 124.

The automated build client 116 is configured to build the virtual client 314 via the virtual client configuration module 316. With reference to FIG. 2, the automated build client 116 may further include a communication module (not shown) for communicating with the configuration management module 214 of the automated build server 104. When instructed by the configuration management module 214, the automated build client 116 obtains one or more recipes for obtaining and configuring resources of the virtual client 314, which may be instantiated and/or configured by the virtual client configuration module 316 within the hypervisor 312. As discussed previously, the automated build client may obtain the resources for instantiating on the virtual client 314 from an application server 110 in communication with the virtual server 106. In one alternative embodiment, the resources may be stored or accessible via the automated build server 104. In another alternative embodiment, the resources are locally accessible to the virtual server 106 (e.g., in communication with the virtual server 106 via a Universal Serial Bus interface of an external storage device).

When the build process of the virtual client has reached a predetermined point (e.g., after the instantiation and/or configuration of a particular resource), the virtual client configuration module 316 then instructs the virtual client (e.g., virtual client 314) to obtain the PHT 124 for performing a security policy audit on the virtual client. In one embodiment, the virtual client 314 obtains the PHT 124 from the application server 110. Alternatively, the virtual client 314 may obtain the PHT 124 from another machine, such as the automated build server 104, or, further still, the PHT 124 may be locally stored by the virtual server 106 (e.g., outside of the hypervisor environment).

As discussed previously, the PHT 124 is locally executed by the virtual client 314 to conduct a security audit of the resources configured on the virtual client 314. With reference to FIG. 2, and in one embodiment, the PHT 124 generates a report (e.g. validation report 224), which is communicated to the automated build server 104 for analysis (e.g., by the validation report analyzer module 216). The results of the analysis determine whether the virtual client 314 is to be placed in an operating mode or in a mode having restrictions on or more resources. In an alternative embodiment, the PHT 124 communicates the results of the security audit to the virtual client configuration module 316 (e.g., an audit success message, an audit failure message, an operating mode, etc.), which retrieves a cookbook and/or recipe corresponding to the results provided by the PHT 124. After the audit, the virtual client configuration module 316 continues the build process for the virtual client 314, and then sends a message to the configuration management module 214 when the build process is completed. The virtual client configuration module 316 may further send an operating mode of the virtual client 314, along with any restrictions on any of the resources should the operating mode be a restricted operating mode (e.g., as a result of failing the security audit). As discussed previously, the results of the security audit and the operating mode of the virtual client 314 may then be communicated to the client device 108 that requested the build of the virtual client 314.

Figure 4:
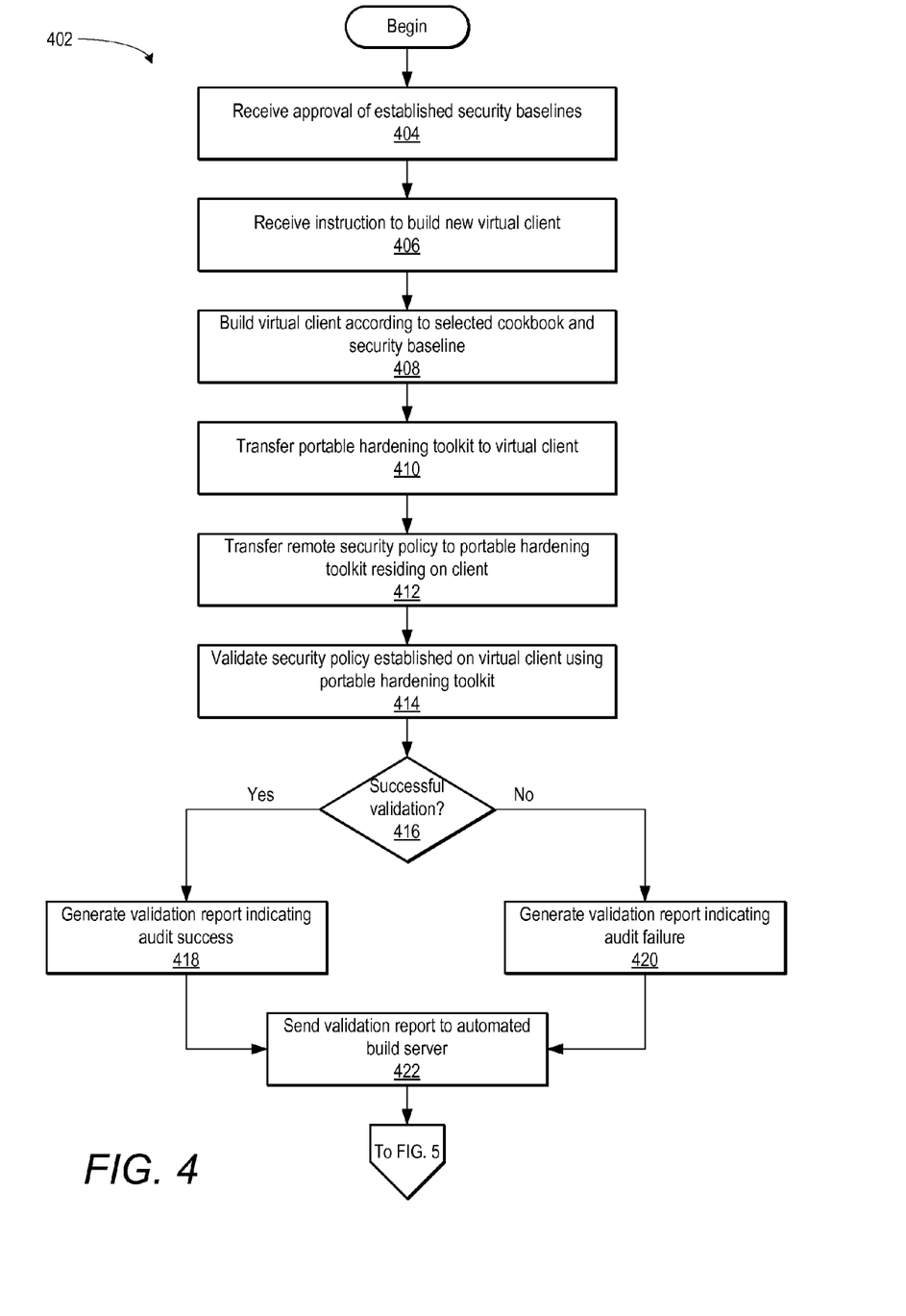
FIGS. 4-5 is a flow diagram illustrating a method for automatically validating a virtual client according to an example embodiment.
Figure 5:
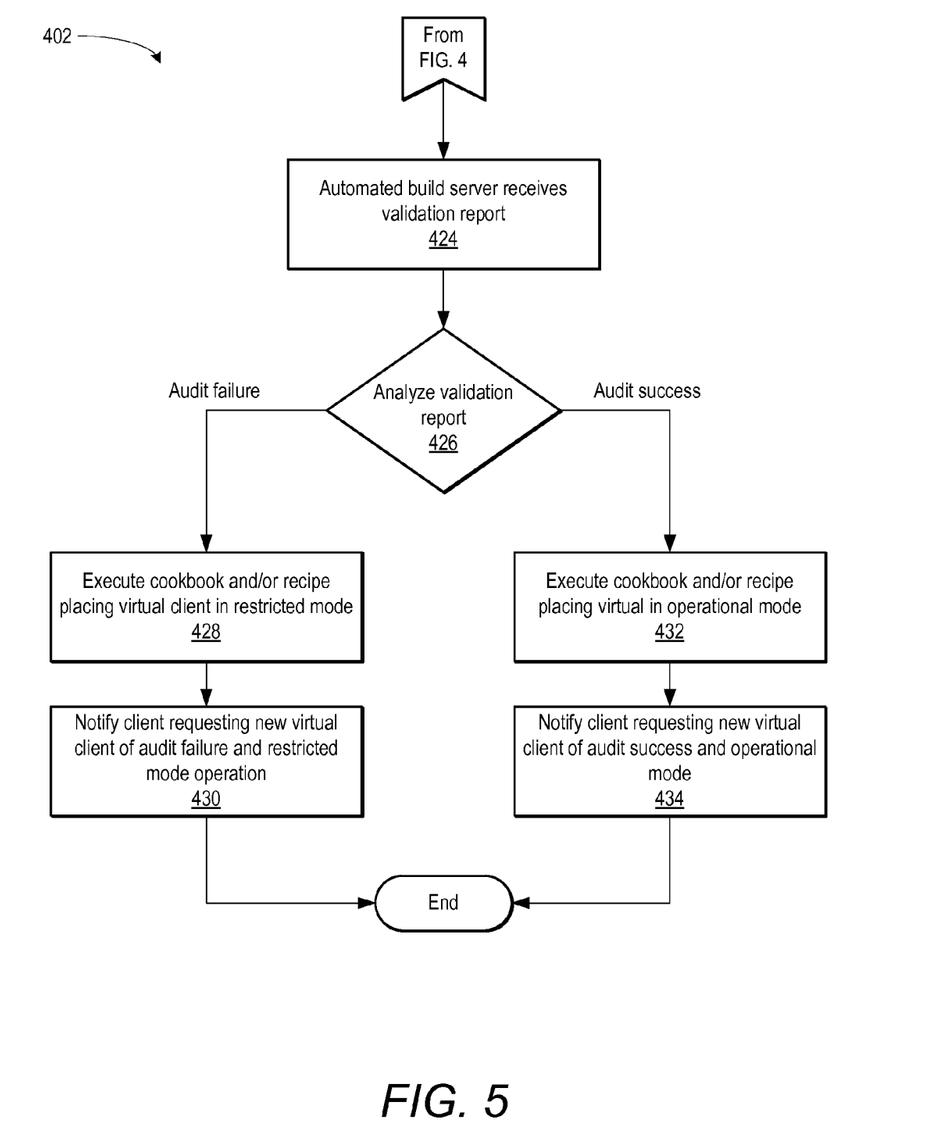

FIGS. 4-5 is a flow diagram illustrating a method 402 for automatically validating a virtual client according to an example embodiment. The method 402 may be implemented on one or more of the automated build server 104 and/or the automated build client 116 and, accordingly, is merely described by way of reference thereto. Initially, one or more previously approved security baselines (e.g., security policies) may be established in the local security policies datastore 112 (Operation 404). As discussed previously, an authenticating entity, such as the DISA FSO approves one or more security baselines. The automated build server 104, via the user interface 212, then receives an instruction to build a new virtual client on a selected node (e.g., the virtual server 106) (Operation 406). The automated build server 104, via the configuration management module 214, then communicates an instruction the automated build client 116 (e.g., the virtual client configuration module 316) to build the requested new virtual client.

The virtual client configuration module 316 then obtains one or more cookbooks and/or recipes from the automated build server 104 to build the new virtual client (Operation 408). As discussed previously, and in one embodiment, the cookbooks and/or recipes may conform with one or more of the previously approved security baselines. Alternatively, one or more of the previously approved security baselines may be implemented on the virtual client during and/or after a predetermined point in the build process.

The virtual client configuration module 316 then instructs the virtual client to obtain a security validation module (e.g., the PHT 124) for conducting a security audit on the newly built virtual client (Operation 410). A remotely stored security baseline may be transferred to the PHT 124 for comparing the remotely stored security baseline with the configured resources of the virtual client (Operation 412). Alternatively, the PHT 124 may obtain one or more of the security baselines local to the automated build server 104 and/or the automated build client 116. The PHT 124 then performs the security audit on the newly built virtual client (Operation 414).

If the validation is successful ("Yes" branch of Operation 416), the PHT 124 generates an output (e.g., a report and/or return code) that indicates that the audit was a success (Operation 418). If the validation is not successful ("No" branch of Operation 416), the PHT 124 generates an output that indicates that the audit was a failure (Operation 420). Additionally or alternatively, the output may also indicate which of the resources of the virtual client failed the security audit. The PHT 124 then communicates the output to the automated build server 104 (Operation 422). Additionally or alternatively, the PHT 124 may communicate the output to the virtual client configuration module 316.

Referring to FIG. 5, the automated build server 106 receives the output (e.g., the report and/or return code) from the PHT 124 (Operation 424). The automated build server 106 then analyzes, via the validation report analyzer 216, the received output (Operation 426). Where the validation report analyzer 216 determines that the audit performed by the PHT 124 was a failure, the automated build server 106 instructs the automated build client 116 to place the virtual client in a restricted operating mode (e.g., by executing one or more corresponding cookbooks and/or recipes retrievable from the automated build server 106) (Operation 428). The client device requesting the new virtual client may then be informed of the security audit failure and of the restricted operating mode of the virtual client (Operation 430). Alternatively, where the audit performed by the PHT 124 is determined to be a success, the automated build server 106 instructs the automated build client 116 to place the virtual client in an operational mode (Operation 432). The client device requesting the new virtual client may then be informed of the security audit success and of the operational mode of the virtual client (Operation 434). In an alternative embodiment, the PHT 124 communicates the security audit success or failure to the automated build client 116, which then executes the one or more corresponding cookbooks and/or recipes accordingly.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 6:
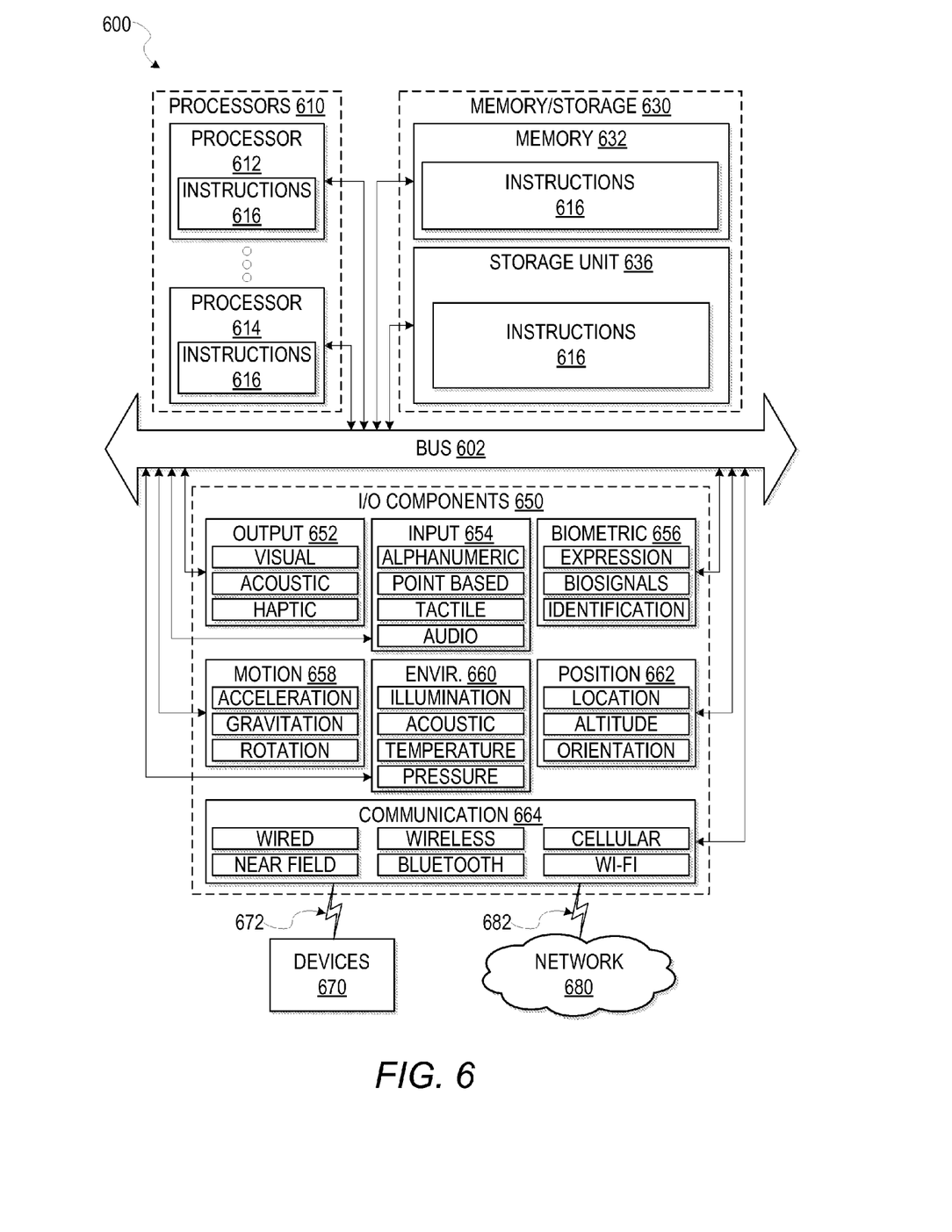
FIG. 6 illustrates a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example the instructions may cause the machine to execute the flow diagrams of FIGS. 4-5. Additionally, or alternatively, the instructions may implement configuration management module 214 and the validation report analyzer module 216 of FIG. 2, and/or the automated build client 116 and the hypervisor 312 of FIG. 3, and so forth. The instructions transform the general, non-programmed machine into a particular machine programmed to carry out the described and illustrated functions in the manner described. In alternative embodiments, the machine 600 operates as a stand-alone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a web appliance, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system for automating security validation, using previously approved security policies, on a virtual machine instantiated through an automated build process, the system comprising:
   a configuration module, using at least one hardware processor, configured to: receive a build instruction to instantiate a virtual client; request a first plurality of recipes in response to the build instruction, each recipe specifying at least one resource selected from a plurality of resources to be instantiated on the virtual client in a first configuration defined by a first security policy; configure the virtual client to obtain a security validation module, the security validation module configured to:
   validate the first configuration of the plurality of resources instantiated on the virtual client against a second security policy;
   provide an output that includes the results of the validation;
   the configuration module is further configured to:
      communicate the results provided by the security validation module to a validation report analyzer configured to determine whether the validation performed by the security validation module was successful;
      configure the virtual client to be in a first operating mode in response to the validation report analyzer providing a determination that the security validation was successful; and configure the virtual client to be in a second operating mode in response to the validation report analyzer providing a determination that the security validation was not successful; wherein:
   the first operating mode is a mode where the virtual client is authorized to perform a plurality of tasks; and
   the second operating mode is a mode where the virtual client is restricted from performing at least one of the plurality of tasks.

2. The system of claim 1, wherein the first security policy was previously approved for deployment to the configuration module.

3. The system of claim 2, wherein the second security policy was approved for validating against the first security policy after the approval of the first security policy.

4. The system of claim 1, wherein the plurality of resources comprise a plurality of services provided by an operating system of the virtual client.

5. The system of claim 1, wherein the configuration module is further configured to obtain a resource selected from the plurality of resources from an application server in communication with the configuration module.

6. The system of claim 1, further comprising:
   an interface module, using at least one processor, configured to provide the determination of whether the validation by the security validation module was successful to a client machine having provided the build instruction, the client machine in communication with the interface module.

7. The system of claim 1, wherein the report generated by the security validation module includes an identification of at least one improperly configured resource based on the validation performed by the validation report analyzer.

8. A method for automating security validation, using previously approved security policies, on a virtual machine instantiated through an automated build process, the method comprising:
   receiving, using at least one hardware processor, a build instruction to instantiate a virtual client;
   requesting, using the at least one hardware processor, a first plurality of recipes in response to the build instruction, each recipe specifying at least one resource selected from a plurality of resources to be instantiated on the virtual client in a first configuration defined by a first security policy;
   configuring, with the at least one hardware processor, the virtual client to obtain a security validation module, the security validation module configured to:
   validating, with the at least one hardware processor, the first configuration of the plurality of resources instantiated on the virtual client against a second security policy;

generating, with the at least one hardware processor, an output that includes the results of the validation;

communicating the results of the validation to a validation report analyzer configured to determine whether the validation performed by the security validation module was successful;

configuring the virtual client to be in a first operating mode in response to the validation report analyzer providing a determination that the security validation was successful; and configuring the virtual client to be in a second operating mode in response to the validation report analyzer providing a determination that the security validation was not successful; wherein:

the first operating mode is a mode where the virtual client is authorized to perform a plurality of tasks; and the second operating mode is a mode where the virtual client is restricted from performing at least one of the plurality of tasks.

9. The method of claim 8, wherein the first security policy was previously approved for deployment.

10. The method of claim 9, wherein the second security policy was approved for validating against the first security policy after approval of the first security policy.

11. The method of claim 8, further comprising:
providing the determination of whether the validation by the security validation module was successful to a client machine having provided the build instruction.

12. The method of claim 8, wherein the generated report includes an identification of at least one improperly configured resource based on the performed validation.

13. A non-transitory computer-readable medium having computer-executable instructions stored thereon that, when executed by at least one hardware processor, cause the at least one hardware processor to perform a method for automating security validation, using previously approved security policies, on a virtual machine instantiated through an automated build process, the method comprising:

receiving, using at least one hardware processor, a build instruction to instantiate a virtual client;

requesting, using the at least one hardware processor, a first plurality of recipes in response to the build instruction, each recipe specifying at least one resource selected from a plurality of resources to be instantiated on the virtual client in a first configuration defined by a first security policy;

configuring, with the at least one hardware processor, the virtual client to obtain a security validation module, the security validation module configured to:

validating, with the at least one hardware processor, the first configuration of the plurality of resources instantiated on the virtual client against a second security policy;

generating, with the at least one hardware processor, an output that includes the results of the validation;

communicating the results of the validation to a validation report analyzer configured to determine whether the validation performed by the security validation module was successful;

configuring the virtual client to be in a first operating mode in response to the validation report analyzer providing a determination that the security validation was successful; and configuring the virtual client to be in a second operating mode in response to the validation report analyzer providing a determination that the security validation was not successful, wherein:

the first operating mode is a mode where the virtual client is authorized to perform a plurality of tasks; and the second operating mode is a mode where the virtual client is restricted from performing at least one of the plurality of tasks.

* * * * *

UNITED STATES PATENT AND TRADEMARK OFFICE
CERTIFICATE OF CORRECTION

PATENT NO. : 9,516,063 B2  
APPLICATION NO. : 14/643644  
DATED : December 6, 2016  
INVENTOR(S) : Savage et al.

Page 1 of 1

It is certified that error appears in the above-identified patent and that said Letters Patent is hereby corrected as shown below:

In the Specification

In Column 11, Line 28, delete "106" and insert --104--, therefor

In Column 11, Line 31, delete "106" and insert --104--, therefor

In Column 11, Line 34, delete "106" and insert --104--, therefor

In Column 11, Line 38, delete "106)" and insert --104)--, therefor

In Column 11, Line 43, delete "106" and insert --104--, therefor

In the Claims

In Column 19, Line 24, in Claim 10, after "after", insert --the--

Signed and Sealed this  
Nineteenth Day of June, 2018

Andrei Iancu  
*Director of the United States Patent and Trademark Office*